(12) United States Patent
Kim et al.

(10) Patent No.: US 8,372,475 B2
(45) Date of Patent: Feb. 12, 2013

(54) METHOD FOR PREPARING CROSS-LINKED CERAMIC-COATED SEPARATOR CONTAINING IONIC POLYMER, CERAMIC-COATED SEPARATOR PREPARED BY THE METHOD, AND LITHIUM SECONDARY BATTERY USING THE SAME

(75) Inventors: Dong Gun Kim, Seoul (KR); Sa Heum Kim, Gyeonggi-do (KR); Seung Ho Ahn, Gyeonggi-do (KR); Dong Won Kim, Seoul (KR); Ji Ae Choi, Daejeon (KR)

(73) Assignees: Hyundai Motor Company, Seoul (KR); Industry-University Cooperation Foundation Hanyang University, Seoul (KR)

( * ) Notice: Subject to any disclaimer, the term of this patent is extended or adjusted under 35 U.S.C. 154(b) by 559 days.

(21) Appl. No.: 12/620,150

(22) Filed: Nov. 17, 2009

(65) Prior Publication Data
US 2011/0027658 A1   Feb. 3, 2011

(30) Foreign Application Priority Data

Jul. 29, 2009   (KR) .................. 10-2009-0069411

(51) Int. Cl.
*B05D 5/12* (2006.01)
*B05D 3/02* (2006.01)
*C08F 2/48* (2006.01)

(52) U.S. Cl. .................. 427/115; 427/384; 427/508

(58) Field of Classification Search .................. 427/115, 427/384, 508
See application file for complete search history.

(56) References Cited

U.S. PATENT DOCUMENTS

| 6,632,561 | B1 * | 10/2003 | Bauer et al. ................ 429/144 |
| 7,695,870 | B2 * | 4/2010 | Park et al. .................. 429/251 |
| 2005/0181269 | A1 | 8/2005 | Eshraghi et al. |
| 2007/0020525 | A1 * | 1/2007 | Kim et al. .................. 429/251 |
| 2008/0292968 | A1 * | 11/2008 | Lee et al. ................... 429/247 |
| 2009/0029261 | A1 * | 1/2009 | Thomas-Alyea et al. .... 429/248 |

FOREIGN PATENT DOCUMENTS

| JP | 2001-319634 A | 11/2001 |
| JP | 2003-331923 A | 11/2003 |
| JP | 2006-14756 A | 6/2006 |
| KR | 10-0727247 | 6/2007 |

* cited by examiner

*Primary Examiner* — Brian K Talbot
(74) *Attorney, Agent, or Firm* — Edwards Wildman Palmer LLP; Peter F. Corless (57) ABSTRACT

The present invention provides method for preparing a cross-linked ceramic-coated separator containing an ionic polymer, a ceramic-coated separator prepared by the method, and a lithium secondary battery using the same. According to preferred methods for preparing a cross-linked ceramic-coated separator, a coating material containing ceramic particles for improving thermal and mechanical characteristics, a functional inorganic compound for improving cycle characteristics and high rate characteristics of a battery, and an ionic polymer for bonding the ceramic particles and the functional inorganic compound on a porous membrane substrate is coated on the porous membrane substrate and subjected to chemical cross-linking.

20 Claims, 4 Drawing Sheets

METHOD FOR PREPARING CROSS-LINKED CERAMIC-COATED SEPARATOR CONTAINING IONIC POLYMER, CERAMIC-COATED SEPARATOR PREPARED BY THE METHOD, AND LITHIUM SECONDARY BATTERY USING THE SAME

CROSS-REFERENCE TO RELATED APPLICATION

This application claims under 35 U.S.C. §119(a) the benefit of Korean Patent Application No. 10-2009-0069411 filed Jul. 29, 2009, the entire contents of which are incorporated herein by reference.

BACKGROUND (a) Technical Field

The present disclosure relates, in general, to a method for preparing a cross-linked ceramic-coated separator containing an ionic polymer, a ceramic-coated separator suitably prepared by the method, and a lithium secondary battery using the same. In particular preferred embodiments, the present invention relates to a method for preparing a cross-linked ceramic-coated separator in which a coating material containing ceramic particles for improving thermal and mechanical characteristics, a functional inorganic compound for improving cycle characteristics and high rate characteristics of a battery, and an ionic polymer for bonding the ceramic particles and the functional inorganic compound on a porous membrane substrate is suitably coated on the porous membrane substrate and then subjected to chemical cross-linking, a ceramic-coated separator suitably prepared by the method, and a lithium secondary battery using the same.

(b) Background

Recently, lithium secondary batteries have attracted much attention as medium and large power sources for power tools, electric bicycles (e-bike), hybrid electric vehicles (HEVs), plug-in HEVs, and the like, as well as power sources for portable electronic devices such as cellular phones, notebook computers, and the like.

Due to the expansion of application fields and the increase in demand, the external shapes and sizes of the batteries are varied, and the lithium secondary batteries are required to have durability and safety characteristics better than those of existing small batteries.

Preferably, the lithium secondary battery is preferably prepared in such a manner that materials capable of intercalating and deintercalating lithium ions are used as negative and positive electrode materials, a porous separator is suitably disposed between the two electrodes, and an electrolyte is suitably injected into the porous separator. Preferably, electricity is generated or consumed by oxidation and reduction reactions due to intercalation and deintercalation of lithium ions in the negative and positive electrodes.

Preferably, the porous separator serves to prevent physical contact between the negative and positive electrodes and, at the same time, allow lithium ions to pass through pores. While the separator itself does not participate in an electrochemical reaction during charge/discharge, it may have a considerable effect on the cycle characteristics and safety of the battery based on the porosity, hydrophilicity, and material quality.

Preferably, a polyolefin membrane used as the separator of the lithium ion battery suitably exhibits a thermal shrinkage behavior at a temperature over 100° C. due to material characteristics and manufacturing process characteristics including elongation, and thus a short circuit between the negative and positive electrodes suitably occurs at high temperatures, which may cause safety accidents. Further, in terms of mechanical characteristics, the polyolefin separator has suitably low physical strength, and thus an internal short circuit easily occurs due to foreign materials present in the battery.

Since the polyolefin separator exhibits hydrophobicity due to its material characteristics, the affinity for an electrolyte having high polarity is suitably low. Further, since it is difficult for the electrolyte to permeate the separator, the electrolyte may leak to the exterior of the battery.

Accordingly, it is necessary to develop a new separator capable of suitably maintaining the performance of the lithium secondary battery and suitably improving the thermal safety, the mechanical strength, and the affinity for the electrolyte, which will be able to suitably accelerate the development of lithium secondary batteries having high performance and high safety.

In accordance with this trend, extensive research and development on organic/inorganic composite separators that are suitably prepared by coating ceramic particles and a binder polymer on a polyolefin or polyester porous membrane have been carried out.

U.S. Patent Publication No. 20050255769, incorporated by reference in its entirety herein, is directed to a separator that is prepared by coating hydrophilic ceramic nanoparticles (such as aluminum oxide, silicon oxide, and zirconium oxide) on a sheet-like flexible substrate such as polyethylene terephthalate nonwoven having a thickness of less than 30 μm and preferably exhibiting excellent thermal and chemical characteristics using an inorganic binder material. The thus prepared separator is thermally stable at high temperatures, does not cause thermal shrinkage, and exhibits good electrolyte wettability.

Korean Patent No. 0775310, incorporated by reference in its entirety herein, is directed to an organic/inorganic composite porous separator preferably including an active layer formed by suitably coating the surface of a separator substrate with a mixture of inorganic particles and a binder polymer, and an electrochemical device including the same separator. Preferably, the electrochemical device including the organic/inorganic composite porous separator is suitably applied to a lithium secondary battery to improve thermal and electrochemical safety and performance of the lithium secondary battery.

When the ceramic materials are suitably coated on the separator substrate in the above-described manner, the thermal and mechanical characteristics are suitably improved to prevent the positive and negative electrodes from being short-circuited, thus maintaining the safety of the battery under severe conditions such as high-temperature and overcharge. However, it is necessary that a sufficient amount of ceramic particles be suitably contained in the ceramic materials coated on the porous separator to prevent thermal shrinkage and provide sufficient mechanical strength.

Since the adhesive strength between the coating materials (ceramic particles and binder polymer) and the porous separator substrate is suitably low, the coating materials are easily exfoliated from the substrate and serve as a resistance after manufacturing the battery, thus suitably deteriorating the battery performance.

Moreover, the coated ceramic particles may be suitably separated from the porous separator by the stress that is generated during the battery assembly process including winding, and the thus separated ceramic particles act as a local fault of the secondary battery, which may have a bad effect on the safety of the battery.

Especially, when the adhesive strength between the coating materials and the porous separator substrate is suitably low, the ability for preventing the substrate from thermally shrinking is reduced, and thus it is difficult to prevent a short circuit between the positive and negative electrodes when the lithium secondary battery is over heated.

Further, although the materials widely used as ceramic materials (such as, but not limited to, silica, aluminum oxide, and silicon oxide) contribute to suitably improve the mechanical characteristics of the separator, they serve as a resistance in terms of battery characteristics, thus suitably deteriorating the battery characteristics.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a cross-linked ceramic-coated separator preferably containing an ionic polymer, a ceramic-coated separator suitably prepared by the method, and a lithium secondary battery using the same, in which ceramic particles are suitably coated on a porous membrane substrate using an ionic polymer as a binder through a chemical cross-linking process to considerably improve the adhesive strength between the ceramic particles and the porous membrane substrate and suitably improve the battery performance due to ion conductivity characteristics of the ionic polymer, a functional inorganic compound suitably capable of forming a uniform conductive solid electrolyte interface on the electrode surface during charge/discharge is suitably coated with the ceramic particles to considerably improve the cycle characteristics of a lithium secondary battery, and the morphology such as, but not limited to, the components of the coating material, the content of ceramic particles, the coating thickness, and the porosity together with the cross-linking degree with the content of cross-linking agent are suitably controlled to provide various characteristics of the lithium secondary battery.

In one preferred embodiment, the present invention provides a method for preparing a cross-linked ceramic-coated separator containing an ionic polymer, the method including: (a) suitably preparing a polymer solution by dissolving an ionic polymer in a solvent; (b) suitably preparing an inorganic dispersion solution by dispersing ceramic particles for improving thermal and mechanical characteristics and a functional inorganic compound for forming a conductive solid electrolyte interface during charge/discharge in a solvent; (c) suitably preparing a coating material by adding a curing agent and an initiator to the two solutions prepared in steps (a) and (b) and uniformly mixing the resulting solution; (d) suitably coating the coating material prepared in step (c) on one or both sides of a porous membrane substrate and drying the resulting substrate; (e) suitably preparing a chemically cross-linked separator by chemically cross-linking the substrate obtained in step (d) by thermal polymerization or ultraviolet irradiation; and (f) suitably drying the thus prepared separator.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In a first aspect, the present invention features a method for preparing a cross-linked ceramic-coated separator containing an ionic polymer, the method comprising (a) preparing a polymer solution, (b) preparing an inorganic dispersion solution, (c) preparing a coating material, (d) coating the coating material prepared in step (c) on one or both sides of a porous membrane substrate and drying the resulting substrate, and (e) preparing a chemically cross-linked separator.

In one embodiment, the polymer solution is prepared by dissolving an ionic polymer in a solvent.

In another embodiment, the inorganic dispersion solution is prepared by dispersing ceramic particles for improving thermal and mechanical characteristics and a functional inorganic compound for forming a conductive solid electrolyte interface during charge/discharge in a solvent.

In a further embodiment, the coating material is prepared by adding a curing agent and an initiator to the two solutions prepared in steps (a) and (b) and uniformly mixing the resulting solution.

In one embodiment, the chemically cross-linked separator is prepared by chemically cross-linking the substrate obtained in step (d) by thermal polymerization or ultraviolet irradiation.

In another embodiment, the method further comprises the step of drying the prepared separator.

In a one embodiment, the coating material comprises 10 to 90 wt % of an ionic polymer.

In one embodiment, the coating material comprises 10 to 90 wt % of ceramic particles.

In one embodiment, the coating material comprises 0.01 to 10 wt % of functional inorganic compound.

In another embodiment, the invention features a ceramic-coated separator prepared by the method of any one of the aspects described herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a novel ceramic-coated separator prepared by uniformly coating a solution containing ceramic particles, a functional inorganic compound, an ionic polymer binder, a curing agent, and an initiator on both sides of a porous membrane substrate and chemically cross-linking the resulting substrate by heat or ultraviolet irradiation to exhibit excellent thermal stability, mechanical characteristics, electrochemical stability, ion conductivity characteristics, and affinity for electrolyte. Preferably, the present invention provides a method for preparing a high safety ceramic-coated separator and a lithium secondary battery using the same.

In a preferred embodiment, the present invention provides a method for suitably preparing a ceramic-coated separator, the method including: (a) preparing a polymer solution by suitably dissolving an ionic polymer in a solvent; (b) preparing an inorganic dispersion solution by suitably dispersing ceramic particles for improving thermal and mechanical characteristics and a functional inorganic compound for forming a conductive solid electrolyte interface during charge/discharge in a solvent; (c) preparing a coating material by adding a curing agent and an initiator to the two solutions prepared in steps (a) and (b) and uniformly mixing the resulting solution; (d) coating the coating material prepared in step (c) on one or both sides of a porous membrane substrate and suitably drying the resulting substrate; (e) preparing a chemically cross-linked separator by chemically cross-linking the substrate obtained in step (d) by thermal polymerization or ultraviolet irradiation; and (f) suitably drying the thus prepared separator.

Preferably, the porous membrane used to prepare a ceramic-coated separator in accordance with the present invention may be formed of at least one selected from the group consisting of, but not limited to, a polyolefin resin such as polyethylene and polypropylene, a fluorine resin such as polyvinylidene fluoride and polytetrafluoroethylene, a polyester resin such as polyethylene terephthalate and polybutylene terephthalate, a polyacrylonitrile resin, and a cellulose nonwoven fabric.

In preferred embodiment of the present invention, the porous membrane with a porosity of at least 30%, a thickness of 10 to 100 µm, and an excellent mechanical strength is preferably a microporous membrane or nonwoven fabric.

Preferably, ceramic particles coated on the separator in accordance with preferred embodiments of the present invention are inorganic particles commonly used in the art and not limited to particular ones as far as they are stable within a battery operation voltage (for example, 0 to 5 V based on Li/Li+). Preferably, these ceramic particles exhibit strong mechanical characteristics and excellent heat resistance characteristics at high temperatures, and thus when they are coated on the porous membrane substrate, the thermal and mechanical characteristics of the separator are suitably improved. Accordingly, it is possible to prevent the positive and negative electrodes from being short-circuited, thus suitably maintaining the safety of the battery under severe conditions such as high-temperature and overcharge.

According to preferred embodiments of the invention, the ceramic particles may include, but are not limited only to, $SiO_2$, $Al_2O_3$, $TiO_2$, $SnO_2$, $CeO_2$, $ZrO_2$, $BaTiO_3$, and $Y_2O_3$ and at least two kinds of these ceramic particles may be mixed. Preferably, the diameter of these ceramic particles is not limited, but may preferably be in the range of 0.001 to 1 µm to uniformly disperse the particles, control the thickness of the coating layer, and suitably maintain an adequate porosity. This diameter is preferable because it has been found that if the diameter of the ceramic particles is suitably less than 0.001 µm, their dispersion property is suitably decreased, and thus it is difficult to uniformly coat the solution on the porous membrane substrate. Further, if the diameter is more than 1 µm, the size of pores formed on the coating layer is suitably large, and further it is difficult to control the thickness of the coating layer.

In preferred exemplary embodiments, the content of the ceramic particles may be in the range of 10 to 90 wt % with respect to 100 wt % of the coating material (mixed with ceramic particles, functional inorganic compound, and polymer binder). A reason for this is that if the ceramic content is low, it is suitably difficult to achieve an improvement in the heat resistance and mechanical characteristics by the ceramic particles, whereas if the ceramic content is excessively high, the adhesive force between the ceramic particles and the porous membrane substrate decreases, and the battery performance suitably deteriorates.

In further preferred embodiments, the functional inorganic compound contained in the coating material of the present invention is used to suitably form a uniform solid electrolyte interface on the electrode surface during charge/discharge reaction of the lithium secondary battery, thus suitably improving the cycle characteristics and high rate characteristics of the battery. Preferably, the functional inorganic compound may include $AlX_3$, $MgX_2$, and $SnX_2$ (wherein X represents a halogen atom), which serve to form a protective film by reacting with lithium ions during charge/discharge or form a protective layer by surface adsorption, thus suitably improving the cycleability of the lithium secondary battery.

In certain exemplary embodiments, the content of the functional inorganic compound may be in the range of 0.01 to 10 wt % with respect to 100 wt % of the coating material (preferably mixed with ceramic particles, functional inorganic compound, and polymer binder). Preferably, if the content is less than 0.01 wt %, no solid electrolyte interface is suitably formed on the electrode surface, and thus it is difficult to improve the cycle characteristics of the battery, whereas if the content is more than 10 wt %, the manufacturing cost increases.

Conventionally, polyvinylidene fluoride and a copolymer thereof, a polyethylene oxide, and an acrylate polymer have been used as a suitable binder to coat the ceramic material on the porous membrane substrate.

It has been found that when these polymers are used as a binder, it is difficult to uniformly disperse ceramic particles. In particular, the adhesive strength with the separator substrate is suitably low such that the coating materials are separated from the porous membrane substrate.

Accordingly, the present invention preferably uses an ionic polymer as a suitable binder to stably deposit ceramic particles on the separator substrate, where the ionic polymer used in the present invention may preferably be an ionic polymer containing metal cations.

In certain preferred embodiments of the invention, the ionic polymer containing metal cations may be a copolymer comprising at least one selected from, but not limited to, the group consisting of polyacrylic acid, polymethacrylic acid, ethylene-acrylic acid copolymer, ethylene-methacrylic acid copolymer, butadiene-acrylic acid copolymer, butadiene-methacrylic acid copolymer, polyvinylsulfonate, chlorosulfonated polyethylene, perfluorosulfonate ionomer, sulfonated polystyrene, styrene-acrylic acid copolymer, and sulfonated butyl rubber. The polymer should contain metal cations such as $Li^+$, $Na^+$, and $Ka^+$.

Preferably, the content of the polymer binder may be in the range of 10 to 90 wt % with respect to 100 wt % of the coating material (mixed with ceramic particles, functional inorganic compound, and polymer binder). If the content is less than 10 wt %, the adhesive strength between the ceramic particles and the porous membrane substrate suitably decreases, whereas if the content exceeds 90 wt %, the porosity of the coating layer suitably decreases, and further it is difficult to achieve the improvement in the heat resistance and mechanical characteristics by the ceramic particles.

In other further embodiments of the present invention, a cross-linking agent used for chemically cross-linking the porous membrane substrate coated with the coating material of the present invention preferably contains at least two double bonds in a molecule. Preferably, any compound capable of being cross-linked by heat or UV irradiation can be used, and the compound may comprise at least one selected from the group consisting of, but not necessarily limited to, divinylbenzene, diacrylate, triacrylate, tetraacrylate, dimethacrylate, trimethacrylate, tetramethacrylate, diallyl ester, triallyl ester, diglycidyl ester, and polyethylene glycol dimethacrylate.

In further preferred embodiments, as the initiator added to initiate a chemical reaction of the cross-linking agent, any compound capable of generating free radicals by heat or UV irradiation can be used, and the compound may comprise one selected from the group consisting of, but not only limited to, an azo compound such as azobisisobutyronitrile, a peroxide compound such as benzoyl peroxide, and a ketone compound such as hydroxy ketone.

Preferably, the solvent used to disperse or dissolve the coating material of the present invention such as ceramic particles, a functional inorganic compound, and a polymer binder should have excellent dissolution characteristics for the polymers and should have non-solvent characteristics for the porous membrane substrate.

In further preferred embodiments, such solvent may comprise at least one selected from the group consisting of, but not only limited to, acetone, tetrahydrofuran, acetonitrile, dimethylformamide, dimethylsulfoxide, dimethylacetamide, N-methylpyrrolidone, and water.

In other preferred embodiments, an electrolyte solvent used when suitably preparing a lithium secondary battery using the ceramic-coated separator of the present invention may preferably comprise at least one selected from the group consisting of, but not only limited to, a cyclic ester such as ethylene carbonate and propylene carbonate, a linear ester such as dimethyl carbonate, diethyl carbonate, and ethylmethylcarbonate, a liner ether such as dimethoxyethane and diethoxyethane, a cyclic ether such as tetrahydrofuran, and a lactone such as γ-butyrolactone.

Preferably, as a lithium salt, lithium hexafluorophosphate ($LiPF_6$), lithium perchlorate ($LiClO_4$), lithium tetrafluoroborate ($LiBF_4$), and lithium trifluoromethanesulfonate ($LiCF_3SO_3$) may be used. It is to be understood that the present invention is not limited to these lithium ions, but may use lithium salts containing various anions.

In further embodiments, when a lithium secondary battery is suitably prepared using the ceramic-coated separator of the present invention, the following materials may preferably be used as positive and negative electrode materials.

In one preferred embodiment, as the positive electrode material, lithium metal oxides such as lithium-cobalt oxide ($LiCoO_2$), lithium-nickel oxide ($LiNiO_2$), lithium-manganese oxide ($LiMn_2O_4$), and lithium iron phosphate ($LiFePO_4$) may be used, and as the negative electrode material, lithium metal, lithium alloy, amorphous carbon, graphite carbon, silicon, tin, titanium, and composites thereof may be used.

Preferred embodiments of the present invention will be illustrated by the examples set forth below, which are provided for the purpose of illustration and should not be interpreted as in any way limiting the scope of the present invention.

Example 1

In a first example, a ceramic-coated separator in accordance with preferred embodiments of the present invention was prepared in the following manner.

1.875 g of poly(lithium 4-styrenesulfonate) having the structure of the following formula 1 as a polymer binder containing ions was suitably dissolved in 6.0 g of water to prepare a polymer solution.

1.875 g of $Al_2O_3$ (with a particle size of 2 to 4 nm) as ceramic particles and 0.1 g of $AlF_3$ as a functional inorganic compound were put into 94 g of dimethylacetamide as a solvent and uniformly dispersed by ball milling.

After mixing the thus prepared two solutions, Kayarad PET-30 (pentaerythritol triacrylate+pentaerythritol tetraacrylate, 7.5 wt % with respect to the coating material) as a curing agent and Irgacure 184 (1-hydroxy-cyclohexyl-phenyl-ketone, 6 wt % with respect to the curing agent) as an additive were added thereto and mixed.

The thus prepared solution was suitably coated on both sides of a porous polyethylene membrane substrate, preferably having a thickness of 25 μm and a porosity of 40%, and the resulting substrate was suitably dried in an oven, preferably at 70° C. for about 30 seconds, and subjected to chemical cross-linking, preferably by irradiating UV for about 10 seconds.

Finally, the chemically cross-linked membrane was suitably dried in a vacuum oven, preferably at 80° C. for more than 24 hours, thus obtaining a ceramic-coated separator on which the ceramic particles, the binder polymer, and the functional inorganic compound were chemically cross-linked on the substrate.

Figure 1:
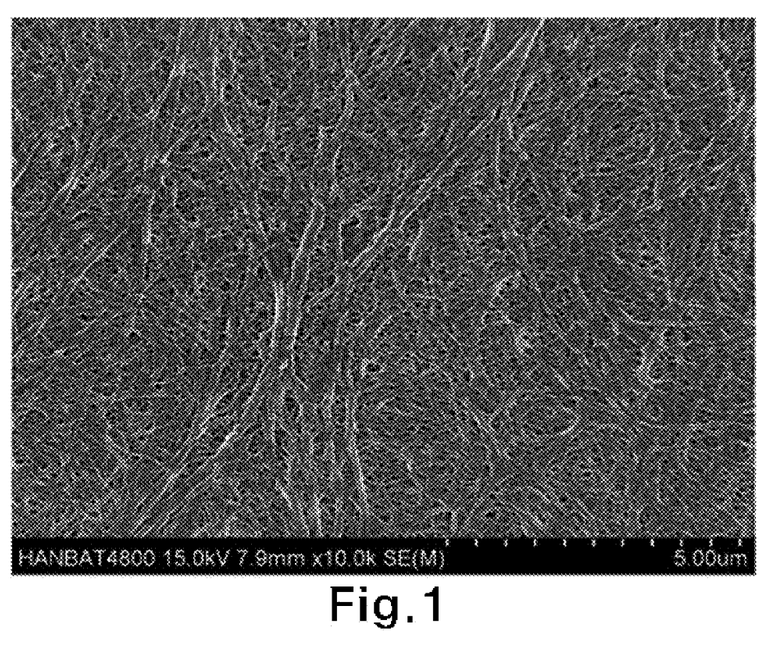
FIG. 1 is a scanning electron micrograph of the surface of a porous polyethylene membrane used to prepare a ceramic-coated separator in accordance with preferred embodiments of the present invention.
Figure 2:
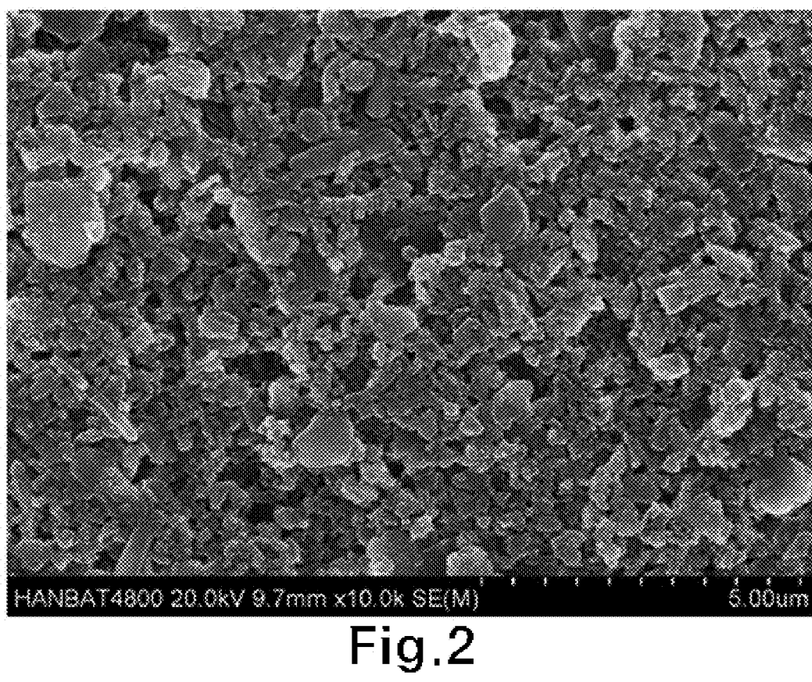
FIG. 2 is a scanning electron micrograph of the surface of a ceramic-coated separator containing ceramic particles, a functional inorganic compound, and an ionic polymer binder as prepared, for example, in Example 1 of the present invention.

Scanning electron micrographs of the surfaces of the porous polyethylene membrane substrate and the ceramic-coated separator prepared using the same were taken and are shown in FIGS. 1 and 2.

As shown in FIG. 2, the ceramic particles were uniformly distributed on the coated surface and a number of pores were suitably formed on the surface of the separator, in which each thickness of the layers suitably formed on both sides of the porous membrane was 2.5 μm and the total thickness of the ceramic-coated separator was 30 μm.

[Formula 1]

Example 2

In another exemplary embodiment, a ceramic-coated separator in accordance with a further preferred embodiment of the present invention was prepared without the chemical cross-linking process.

1.875 g of poly(lithium 4-styrenesulfonate) having the structure of formula 1 as a polymer binder containing ions was suitably dissolved in 6.0 g of water to prepare a polymer solution.

1.875 g of $Al_2O_3$ (with a particle size of 2 to 4 nm) as ceramic particles and 0.1 g of $AlF_3$ as a functional inorganic compound were put into 94 g of dimethylacetamide as a solvent and uniformly dispersed by ball milling.

Preferably, the thus prepared two solutions were mixed to obtain a uniform solution, and the solution was suitably coated on both sides of a porous polyethylene membrane substrate having a thickness of 25 μm and a porosity of 40%, and the resulting substrate was suitably dried in an oven at 70° C. for about 30 seconds.

In a further preferred embodiment, the resulting substrate was suitably dried in a vacuum oven at 80° C. for more than 24 hours, thus suitably obtaining a ceramic-coated separator on which the ceramic particles, the binder polymer, and the functional inorganic compound were suitably coated on the membrane, in which each thickness of the layers formed on both sides of the porous membrane was 2.5 μm and the total thickness of the ceramic-coated separator was 30 μm.

Example 3

In another exemplary embodiment, a ceramic-coated separator in accordance with a further preferred embodiment of the present invention was suitably prepared in the same manner as Example 1 except that $BaTiO_3$ was used as ceramic particles added to suitably prepare a coating material instead of $Al_2O_3$.

Example 4

In another exemplary embodiment, a ceramic-coated separator in accordance with the present invention was suitably prepared in the same manner as Example 1 except that the content of the ceramic particles was adjusted to 25 wt % and that of the polymer binder was adjusted to 75 wt %.

Example 5

In another exemplary embodiment, a ceramic-coated separator in accordance with preferred embodiments of the present invention was suitably prepared in the same manner as Example 1 except that each thickness of the coating material coated on both sides of the porous membrane was 1.5 μm.

Accordingly, the total thickness of the thus obtained ceramic-coated separator was 28 μm.

Example 6

In another exemplary embodiment, a ceramic-coated separator in accordance with preferred embodiments of the present invention was prepared in the same manner as Example 1 except that $AlF_3$ as a functional inorganic compound was not added to the coating material coated on both sides of the porous membrane.

Example 7

In another exemplary embodiment, a ceramic-coated separator in accordance with preferred embodiments of the present invention was suitably prepared in the same manner as Example 1 except that the coating material was preferably coated on one side of the porous membrane instead of both sides thereof and subjected to chemical cross-linking by irradiating UV.

Comparative Example 1

In another further embodiment, a porous polyethylene membrane which was not coated with the ceramic particles and the binder and had a thickness of 25 μm and a porosity of 40% was prepared.

Comparative Example 2

In still another further embodiment, a ceramic-coated separator was prepared in the same manner as Example 1 except that a poly(vinylidenefluoride-hexafluoropropylene) copolymer was used as a suitable binder added to the coating material coated on both sides of the porous membrane instead of poly(lithium 4-styrenesulfonate) as an ionic polymer and was not subjected to chemical cross-linking by irradiating UV.

Test Example 1

Measurement of Electrolyte Wettability, Ion Conductivity, and Electrochemical Stability In a preferred exemplary embodiment of the present invention, the ceramic-coated separators prepared in Examples 1 to 7, the porous polyethylene membrane used as a substrate in Comparative Example 1, and the ceramic-coated separator prepared using the poly(vinylidenefluoride-hexafluoropropylene) copolymer as a binder in Comparative Example 2 were suitably immersed in an electrolyte and taken out to measure electrolyte wettability and ion conductivity.

In a further preferred embodiment, the electrolyte was suitably prepared by dissolving lithium hexafluorophosphate salt in a mixed solution of ethylene carbonate and dimethyl carbonate (volume ratio=1:1) at a concentration of 1 M.

Preferably, it can be seen that the separators prepared by coating the polymer binder and ceramic particles on the porous polyethylene membrane in accordance with the Examples have suitably higher electrolyte wettability and ion conductivity than the separators of the Comparative Examples as shown in the following Table 1.

Preferably, when comparing the ion conductivity characteristics of the ceramic-coated separator using poly(lithium 4-styrenesulfonate) as a binder in Example 2 with those of the ceramic-coated separator using the poly(vinylidenefluoride-hexafluoropropylene) copolymer as a binder in Comparative Example 2, it can be seen that the ceramic-coated separator using poly(lithium 4-styrenesulfonate) as a binder has suitably better electrolyte wettability and ion conductivity characteristics.

A reason for this is that since the poly(lithium 4-styrenesulfonate) contains lithium ions on the polymer side chains, the concentration of ions as a charge carrier is suitably high, and since the binder material itself has high affinity for electrolyte, a larger amount of non-aqueous electrolyte is suitably contained.

TABLE 1

| Example | Electrolyte wettability (%) | Ion conductivity (S/cm) |
|---|---|---|
| Example 1 | 62.6 | $5.7 \times 10^{-4}$ |
| Example 2 | 65.6 | $6.9 \times 10^{-4}$ |
| Example 3 | 66.0 | $6.6 \times 10^{-4}$ |
| Example 4 | 67.5 | $6.5 \times 10^{-4}$ |
| Example 5 | 67.4 | $7.3 \times 10^{-4}$ |
| Example 6 | 70.2 | $8.9 \times 10^{-4}$ |
| Example 7 | 62.5 | $6.1 \times 10^{-4}$ |
| Comparative Example 1 | 53.8 | $2.5 \times 10^{-4}$ |
| Comparative Example 2 | 59.8 | $4.1 \times 10^{-4}$ |

Test Example 2

Analysis of Thermal Shrinkage of Ceramic-Coated Separators at High Temperature

In another preferred embodiment of the present invention, the following test was performed to compare the thermal shrinkage characteristics of the ceramic-coated separators suitably prepared in accordance with the Examples of the present invention, the porous polyethylene membrane substrate in Comparative Example 1, and the ceramic-coated separator suitably prepared in Comparative Example 2.

Preferably, each of the separators was cut into a sample of 3 cm×5 cm, and the samples were kept at a temperature of 105° C. for 1 hour and taken out to measure the size of the shrunk samples, thus suitably measuring the thermal shrinkage, which are shown in the following Table 2:

TABLE 2

| Example | Thermal shrinkage (%) |
|---|---|
| Example 1 | 3.6 |
| Example 2 | 3.8 |
| Example 3 | 4.5 |
| Example 4 | 6.4 |
| Example 5 | 6.1 |
| Example 6 | 3.5 |
| Example 7 | 3.5 |
| Comparative Example 1 | 13.3 |
| Comparative Example 2 | 4.0 |

It can be seen from Table 2 that the thermal shrinkage of the separators prepared in Examples 1, 2, 6, and 7 was considerably reduced due to the ceramic particles and ionic polymer coated on both sides of the porous polyethylene membrane.

Further, it can be seen that the thermal shrinkage was suitably improved by the chemical cross-linking and the thermal stability was suitably improved when the thickness of the coating layers formed on both sides of the porous membrane suitably increased and when the content of the ceramic particles increased.

Figure 3:
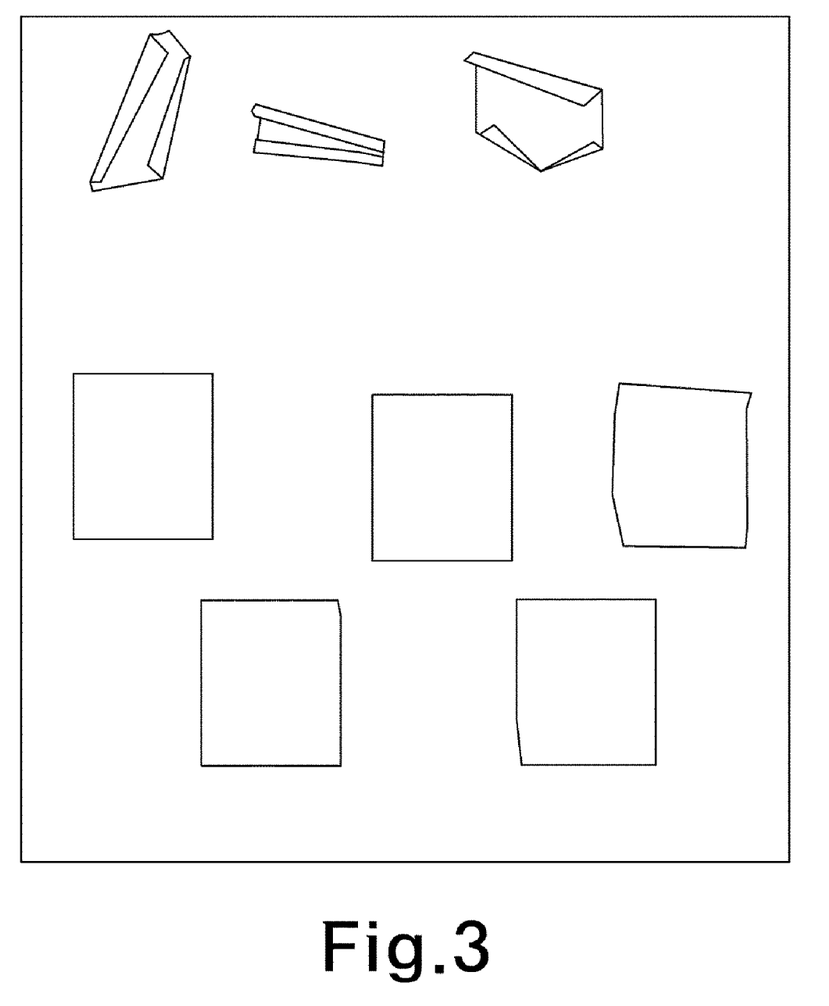
FIG. 3 is an image showing an exemplary polyethylene substrate (Comparative Example 1) and an exemplary ceramic-coated separator (Example 1) which shrink after being kept at 105° C. for 1 hour.

In further preferred embodiments, the thermal shrinkage of the polyethylene separator of Comparative Example 1 and the ceramic-coated separator of Example 1 after being kept at 105° C. for 1 hour was suitably observed and the results are shown in the image of FIG. 3.

According to further preferred embodiments and as shown in FIG. 3, the samples shown at the top are the separators of Comparative Example 1, and the samples shown at the bottom are the separators of Example 1, from which it can be seen that the polyethylene separator prepared in Comparative Example 1 shows considerable thermal shrinkage after being kept at suitably high temperature, whereas the ceramic-coated separator prepared in Example 1 of the present invention exhibits very slight thermal shrinkage.

Test Example 3

Durability Test of Ceramic-Coated Separators

In other preferred embodiments, when the ceramic-coated separator that is suitably prepared by coating the ceramic particles and the binder polymer is in contact with an electrolyte, the adhesive force between the coating material and the porous membrane is so low that the coating materials may be suitably separated from the porous membrane substrate.

In another exemplary embodiment, the following Test Example 3 was performed to evaluate the durability of the ceramic-coated separators.

Preferably, each of the separators was suitably cut into a predetermined size, and the samples were suitably immersed in an electrolyte at room temperature of 25° C., at a low temperature of −20° C., and at a high temperature of 80° C. sequentially for 1 hour. Further, the samples were taken out, dried, and weighed, and the test results are shown in the following Table 3:

TABLE 3

| Example | Initial weight (%) | Weight (%) after being kept at 25° C. | Weight (%) after being kept at −20° C. | Weight (%) after being kept at 80° C. |
|---|---|---|---|---|
| Example 1 | 100 | 100 | 100 | 100 |
| Example 2 | 100 | 100 | 98 | 98 |
| Comparative Example 2 | 100 | 100 | 98 | 88 |

As shown Table 3, since the ceramic-coated separator prepared by chemical cross-linking in Example 1 had excellent adhesive characteristics between the substrate and the coating material, there were no components that were suitably separated by the electrolyte, and thus the initial weight was suitably maintained at 100%.

On the contrary, the ceramic-coated separator prepared without chemical cross-linking in Example 2 had a 2% weight loss, from which it can be seen that a small amount of components were suitably separated.

In other exemplary embodiment, for example in the case of the ceramic-coated separator prepared using poly(vinylidenefluoride-hexafluoropropylene) copolymer as a binder without chemical cross-linking, a 12% weight loss occurred, from which it can be seen that the adhesive strength between the substrate and the coating material was considerably lowered.

Accordingly, when the chemically cross-linked ceramic-coated separator suitably prepared using poly(lithium 4-styrenesulfonate) as an ionic polymer is applied to a lithium secondary battery, it is expected that the ceramic particles and the binder material coated on the substrate may not be easily separated from the substrate due to the strong adhesive force between the substrate and the coating material.

Test Example 4

Preparation and Performance Evaluation of Lithium Secondary Battery

According to another embodiment of the invention, lithium secondary batteries including a carbon negative electrode and a lithium cobalt oxide ($LiCoO_2$) positive electrode were preferably prepared using the ceramic-coated separators prepared in Examples 1 to 7 and the separators prepared in Comparative Examples 1 and 2 in the following manner.

Preferably, the negative electrode material containing 93 wt % of artificial graphite as an active material, 6 wt % of polyvinylidene fluoride as a binder, and 1 wt % of Super-P carbon as a conductive material are suitably coated on a copper foil to prepare a negative electrode.

In further preferred embodiments, the positive electrode material containing 94% of lithium cobalt oxide ($LiCoO_2$) as an active material, 3 wt % of Super-P carbon as a conductive material, and 3 wt % of polyvinylidene fluoride as a binder was suitably coated on an aluminum foil to prepare a positive electrode.

Preferably, the prepared ceramic-coated separator was placed on the positive electrode, the carbon negative electrode was placed thereon, and an electrolyte was suitably injected therebetween, which was then vacuum-packed in an aluminum pouch, thus preparing a lithium secondary battery. According to further preferred embodiments, a charge/discharge test was suitably conducted on the thus prepared lithium secondary batteries in the voltage range of 2.8 to 4.2 V and at a constant density of 0.5 C.

Figure 4:
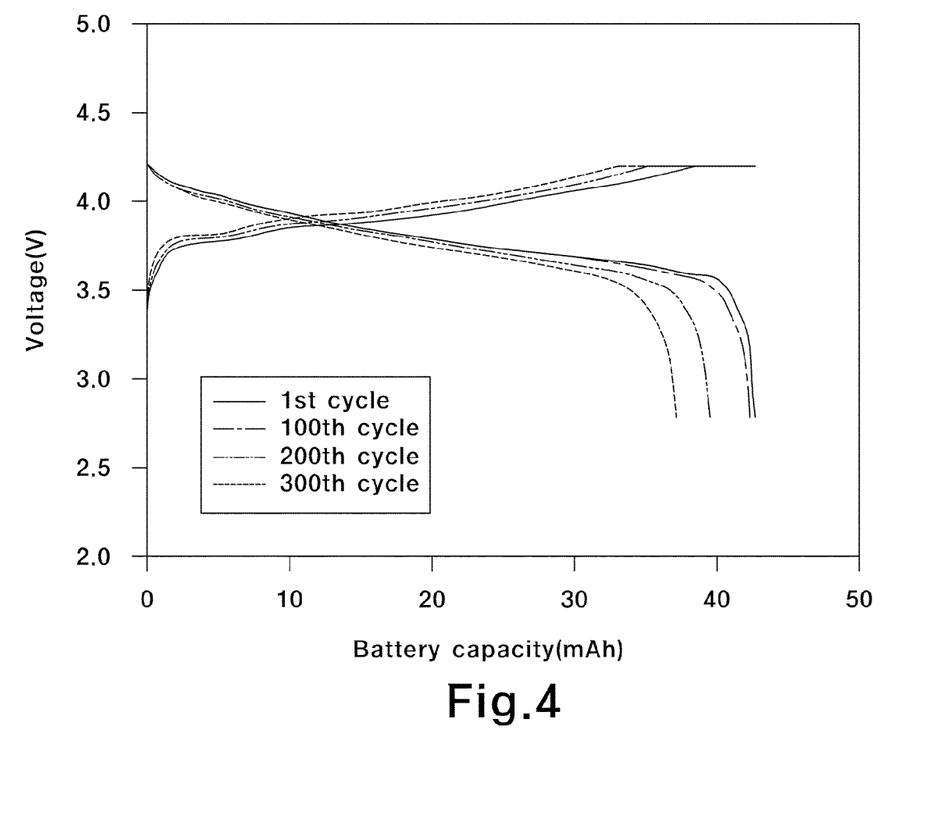
FIG. 4 is a charge/discharge curve according to the number of cycles obtained by suitably charging/discharging a lithium secondary battery using a ceramic-coated separator prepared, for example, in Example 1 of the present invention in the voltage range of 2.8 to 4.2 V and at a constant current of 0.5 C.

The results of the charge/discharge test of the lithium secondary battery prepared using the ceramic-coated separator in Example 1 are shown in the charge/discharge curve of FIG. 4. The results of measuring the capacity retention with respect to initial capacity obtained by charging/discharging 300 times the lithium secondary batteries using the ceramic-coated separators prepared in Examples 1 to 7 and the separators prepared in Comparative Examples 1 and 2 are shown in the following Table 4:

TABLE 4

| Example | Capacity retention with respect to initial capacity after 300 cycles (%) |
|---|---|
| Example 1 | 83.6 |
| Example 2 | 83.2 |
| Example 3 | 80.1 |
| Example 4 | 80.7 |
| Example 5 | 88.1 |
| Example 6 | 76.0 |
| Example 7 | 86.1 |
| Comparative Example 1 | 75.7 |
| Comparative Example 2 | 81.8 |

As show in Table 4, the lithium secondary batteries prepared using the ceramic-coated separators of Examples 1 to 5 and 7 maintained the capacity of more than 80% even after 300 cycles, from which it can be seen that the cycle characteristics of the lithium secondary batteries are better than the lithium secondary battery prepared using the polyethylene separator in Comparative Example 1.

In further preferred embodiments, it can be seen that in the ceramic-coated separator of Example 6 in which $AlF_3$ as a functional inorganic compound was not suitably contained, the cycle characteristics of the lithium secondary battery was suitably deteriorated compared to the ceramic-coated separator of Example 1 in which $AlF_3$ as a functional inorganic compound was suitably contained.

Accordingly, when the lithium secondary battery is suitably prepared using the ceramic-coated separator containing the functional inorganic compound ($AlF_3$), a conductive solid electrolyte interface (SEI) is formed the negative or positive electrode interface with the repetition of cycles to reduce the resistance of the electrode/electrolyte interface, thus suitably improving the cycle characteristics of the battery.

Test Example 5

Evaluation of Thermal Stability of Lithium Secondary Batteries

In further exemplary embodiments of the invention, the lithium secondary batteries prepared using the ceramic-coated separators in Examples 1 to 7 and the separators prepared in Comparative Examples 1 and 2 were kept in the temperature range of 150 to 200° C. for 1 hour to determine whether a short circuit has occurred in the batteries. The results are shown in the following Table 5:

TABLE 5

| Example | 150° C. | 160° C. | 170° C. | 180° C. | 190° C. | 200° C. |
|---|---|---|---|---|---|---|
| Example 1 | Normal | Normal | Normal | Normal | Normal | Normal |
| Example 2 | Normal | Normal | Normal | Normal | Normal | Normal |
| Example 3 | Normal | Normal | Normal | Normal | Normal | Normal |
| Example 4 | Normal | Normal | Normal | Shorted | | |
| Example 5 | Normal | Normal | Normal | Normal | Normal | Normal |
| Example 6 | Normal | Normal | Normal | Normal | Normal | Normal |
| Example 7 | Normal | Normal | Normal | Normal | Normal | Normal |
| Comparative Example 1 | Normal | Shorted | | | | |
| Comparative Example 2 | Normal | Normal | Normal | Normal | Normal | Normal |

As shown in Table 5, the battery of Comparative Example 1 prepared using the polyethylene separator had an internal short circuit after being kept at a temperature of 160° C. for 1 hour, which indicates that the polyethylene separator was melted or thermally shrunk due to the high-temperature and thus the internal short circuit between the negative and positive electrodes of the battery occurred. Therefore, a conclusion from these experiments is that the thermal stability of the polyethylene separator is vulnerable to the high temperature.

On the contrary, it can be seen that the batteries using the ceramic-coated separators of FIGS. 1 to 3 and Examples 5 to 7, except for Example 4, had no internal short circuit up to 200° C.

In Example 4, in which the ceramic content was 25%, the thermal stability was suitably improved; however, an internal short circuit occurred at 180° C.

Taken together, it can be seen that the thermal stability is considerably improved by suitably coating the ceramic particles on the porous polyethylene membrane and the thermal characteristics are suitably improved when the ceramic content and the thickness are suitably increased.

As described above, the present invention provides the following effects.

According to preferred embodiments of the present invention, since the ceramic particles are suitably coated on the surface of the porous membrane substrate with the ionic polymer as a binder and subjected to chemical cross-linking, it is possible to suitably prevent thermal shrinkage at high temperatures due to the heat resistance characteristics and strong mechanical characteristics of the ceramic material coated on the porous membrane, suitably improve the resistance against external penetration, suitably prevent the electrolyte from leaking due to the high affinity for the electrolyte of the ionic polymer used as a binder, and provide suitably high ion conductivity.

Moreover, since the adhesive strength between the coating material and the porous membrane substrate is suitably increased by the chemical cross-linking, it is possible to suitably prevent the coating material from being separated and improve the durability of the ceramic-coated separator.

Furthermore, since the functional inorganic compound capable of improving the cycle characteristics or high rate characteristics of the lithium secondary battery is added to the coating material, it is possible to suitably improve the cycle characteristics of the lithium secondary battery.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for preparing a cross-linked ceramic-coated separator containing an ionic polymer, the method comprising:
    (a) preparing a polymer solution by dissolving an ionic polymer in a solvent;
    (b) preparing an inorganic dispersion solution by dispersing ceramic particles for improving thermal and mechanical characteristics and a functional inorganic compound for forming a conductive solid electrolyte interface during charge/discharge in a solvent;
    (c) preparing a coating material by adding a curing agent and an initiator to the two solutions prepared in steps (a) and (b) and uniformly mixing the resulting solution;
    (d) coating the coating material prepared in step (c) on one or both sides of a porous membrane substrate and drying the resulting substrate;
    (e) preparing a chemically cross-linked separator by chemically cross-linking the substrate obtained in step (d) by thermal polymerization or ultraviolet irradiation; and
    (f) drying the thus prepared separator.

2. The method of claim 1, wherein the coating material comprises 10 to 90 wt % of the ionic polymer, 10 to 90 wt % of the ceramic particles, and 0.01 to 10 wt % of the functional inorganic compound.

3. The method of claim 1, wherein the ionic polymer used as a binder is a copolymer containing metal cations and comprising at least one selected from the group consisting of polyacrylic acid, polymethacrylic acid, ethylene-acrylic acid copolymer, ethylene-methacrylic acid copolymer, butadiene-acrylic acid copolymer, butadiene-methacrylic acid copolymer, polyvinylsulfonate, chlorosulfonated polyethylene, perfluorosulfonate ionomer, sulfonated polystyrene, styrene-acrylic acid copolymer, and sulfonated butyl rubber.

4. The method of claim 1, wherein the ceramic particles comprise at least one selected from the group consisting of: $SiO_2$, $Al_2O_3$, $TiO_2$, $SnO_2$, $CeO_2$, $ZrO_2$, $BaTiO_3$, and $Y_2O_3$.

5. The method of claim 4, wherein the ceramic particles have a diameter in the range of 0.001 to 1 μm.

6. The method of claim 1, wherein the functional inorganic compound comprises at least one selected from the group consisting of: $AlX_3$, $MgX_2$, and $SnX_2$ in which X represents a halogen atom such as F, Cl, Br, and I.

7. The method of claim 1, wherein the porous membrane substrate comprises at least one selected from the group consisting of: a polyolefin resin, a fluorine resin, a polyester resin, a polyacrylonitrile resin, and a cellulose nonwoven fabric.

8. The method of claim 7, wherein the porous membrane has a porosity of at least 30% and a thickness of 10 to 100μ.

9. The method of claim 1, wherein in step (c), a cross-linking agent containing at least two double bonds in a molecule, the cross-linking agent comprising at least one compound selected from the group consisting of: divinylbenzene, diacrylate, triacrylate, tetraacrylate, dimethacrylate, trimethacrylate, tetramethacrylate, diallyl ester, triallyl ester, diglycidyl ester, and polyethylene glycol dimethacrylate.

10. The method of claim 1, wherein the initiator added to initiate a chemical reaction of the cross-linking agent comprises one selected from the group consisting of: an azo compound, a peroxide compound, and a ketone compound.

11. A method for preparing a cross-linked ceramic-coated separator containing an ionic polymer, the method comprising:
    (a) preparing a polymer solution;
    (b) preparing an inorganic dispersion solution;
    (c) preparing a coating material by mixing prepared solutions (a) and (b);
    (d) coating the coating material prepared in step (c) on one or both sides of a porous membrane substrate and drying the resulting substrate; and
    (e) preparing a chemically cross-linked separator,
    wherein the inorganic dispersion solution is prepared by dispersing ceramic particles for improving thermal and mechanical characteristics and a functional inorganic compound for forming a conductive solid electrolyte interface during charge/discharge in a solvent.

12. The method for preparing the cross-linked ceramic-coated separator of claim 11, wherein the polymer solution is prepared by dissolving an ionic polymer in a solvent.

13. The method for preparing the cross-linked ceramic-coated separator of claim 11, wherein the coating material is prepared by adding a curing agent and an initiator to the two solutions prepared in steps (a) and (b) and uniformly mixing the resulting solution.

14. The method for preparing the cross-linked ceramic-coated separator of claim 11, wherein the chemically cross-linked separator is prepared by chemically cross-linking the substrate obtained in step (d) by thermal polymerization or ultraviolet irradiation.

15. The method for preparing the cross-linked ceramic-coated separator of claim 11, further comprising the step of drying the prepared separator.

16. The method for preparing the cross-linked ceramic-coated separator of claim 11, wherein the coating material comprises 10 to 90 wt % of an ionic polymer.

17. The method for preparing the cross-linked ceramic-coated separator of claim 11, wherein the coating material comprises 10 to 90 wt % of ceramic particles.

18. The method for preparing the cross-linked ceramic-coated separator of claim 11, wherein the coating material comprises 0.01 to 10 wt % of functional inorganic compound.

19. The method of claim 1, wherein the porous membrane substrate comprises at least one selected from the group consisting of: polyethylene, polypropylene, polyvinylidene fluoride, polytetrafluoroethylene, polyethylene terephthalate and polybutylene terephthalate.

20. The method of claim 1, wherein the initiator added to initiate a chemical reaction of the cross-linking agent comprises one selected from the group consisting of azobisisobutyronitrile, benzoyl peroxide, and hydroxy ketone.

* * * * *